US011843996B2

(12) United States Patent
Rico Alvarino et al.

(10) Patent No.: US 11,843,996 B2
(45) Date of Patent: *Dec. 12, 2023

(54) TRANSPORT BLOCK SIZE AND RATE MATCHING FOR MULTICAST COMMUNICATIONS

(71) Applicant: QUALCOMM Incorporated, San Diego, CA (US)

(72) Inventors: Alberto Rico Alvarino, San Diego, CA (US); Le Liu, San Jose, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,211

(22) Filed: Sep. 1, 2022

(65) Prior Publication Data
US 2022/0417710 A1 Dec. 29, 2022

Related U.S. Application Data

(63) Continuation of application No. 16/937,232, filed on Jul. 23, 2020, now Pat. No. 11,451,934.
(Continued)

(51) Int. Cl.
H04W 4/06 (2009.01)
H04W 72/121 (2023.01)
H04W 72/1273 (2023.01)

(52) U.S. Cl.
CPC .......... *H04W 4/06* (2013.01); *H04W 72/121* (2013.01); *H04W 72/1273* (2013.01)

(58) Field of Classification Search
CPC . H04W 4/06; H04W 72/121; H04W 72/1273; H04W 72/005; H04L 1/0025;
(Continued)

(56) References Cited

U.S. PATENT DOCUMENTS 11,451,934 B2 9/2022 Rico Alvarino et al.
2018/0049073 A1 2/2018 Dinan et al.
(Continued)

OTHER PUBLICATIONS

Asustek: "Configuration for SC-PTM transmission", 3GPP Draft, R2-152272, Configuration for SC-PTM, 3rd Generation Partnership Project (3GPP), Mobile Competence Centre, 650, Route Des Lucioles, F-06921 Sophia-Antipolis Cedex, France, vol. RAN WG2, No. Fukuoka, Japan, May 25, 2015-May 29, 2015, May 24, 2015 (May 24, 2015), XP050969995, 3 Pages, the whole document.
(Continued)

Primary Examiner — Sharmin Chowdhury
(74) Attorney, Agent, or Firm — ArentFox Schiff LLP

(57) ABSTRACT

A base station may transmit a multicast transmission to a group of user equipments (UEs) that are each configured with a group radio network temporary identifier (G-RNTI). The UEs may be configured to receive the transmission using the same modulation and coding scheme (MCS) and transport block size (TBS) such that the group of UEs may receive the same transmission. In particular, a UE may receive one or more configurations for multicast transmissions, each configuration associated with a G-RNTI. The UE may determine a MCS table for the G-RNTI. The UE may determine a TBS for a multicast transmission based on an overhead value for the G-RNTI. The UE may receive the multicast transmission based on the MCS table and the TBS.

29 Claims, 10 Drawing Sheets

Related U.S. Application Data

(60) Provisional application No. 62/878,616, filed on Jul. 25, 2019.

(58) Field of Classification Search
CPC ... H04L 1/0045; H04L 1/0067; H04L 5/0044; H04L 5/0053; H04L 1/0013; H04L 1/0003; H04L 1/0009
See application file for complete search history.

(56) References Cited

U.S. PATENT DOCUMENTS

| | | | |
|---|---|---|---|
| 2018/0115387 A1 | 4/2018 | Takeda et al. | |
| 2019/0116009 A1* | 4/2019 | Yum | H04L 5/0094 |
| 2019/0313426 A1 | 10/2019 | Lin et al. | |
| 2019/0342058 A1* | 11/2019 | Kwak | H04W 76/11 |
| 2020/0022144 A1 | 1/2020 | Papasakellariou | |
| 2020/0187170 A1 | 6/2020 | Shin et al. | |
| 2021/0013991 A1 | 1/2021 | Park et al. | |
| 2021/0336726 A1 | 10/2021 | Takeda et al. | |

OTHER PUBLICATIONS

Ericsson: "L1 Configuration for Multicast Support for MTC", 3GPP Draft, R1-1610393, L1 Configuration for Multicast Support for MTC, 3rd Generation Partnership Project (3GPP), Mobile Competence Centre, 650, Route Des Lucioles, F-06921 Sophia-Antipolis Cedex, vol. RAN WG1, No. Lisbon, Portugal, Oct. 10, 2016-Oct. 14, 2016 , Oct. 9, 2016 (Oct. 9, 2016), XP051150403, 5 Pages, the whole document.

Ericsson: "Overview of SC-PTM and Common eMTC and NB-IOT Aspects", 3GPP Draft, R2-165636, Overview of SC-PTM and Common eMTC and NB-IoT Aspects, 3rd Generation Partnership Project (3GPP), Mobile Competence Centre, 650, Route Des Lucioles, F-06921 Sophia-Antipolis, vol. RAN WG2, No. Gothenburg, Sweden, Aug. 22, 2016-Aug. 26, 2016, Aug. 21, 2016 (Aug. 21, 2016), XP051127053, 10 Pages, Section 3.3, 3.4.

International Search Report and Written Opinion—PCT/US2020/043581—ISA/EPO—dated Nov. 20, 2020.

* cited by examiner

TRANSPORT BLOCK SIZE AND RATE MATCHING FOR MULTICAST COMMUNICATIONS

CROSS REFERENCE TO RELATED APPLICATIONS

This application is a continuation of U.S. application Ser. No. 16/937,232 titled "TRANSPORT BLOCK SIZE AND RATE MATCHING FOR MULTICAST COMMUNICATIONS" filed Jul. 23, 2020, which claims priority to U.S. Provisional Application No. 62/878,616 titled "TRANSPORT BLOCK SIZE AND RATE MATCHING FOR MULTICAST COMMUNICATIONS," filed Jul. 25, 2019, both of which are assigned to the assignee hereof, and incorporated herein by reference in their entirety.

BACKGROUND

Technical Field

The present disclosure relates generally to communication systems, and more particularly, to a transport block size and rate matching for multicast communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus (e.g., a user equipment (UE)) are provided. The method may include receiving, at UE, one or more configurations for multicast transmissions, each configuration associated with a group radio network temporary identifier (G-RNTI). The method may include selecting a modulation and coding scheme (MCS) table for the G-RNTI. The method may include receiving downlink control information associated with the G-RNTI. The method may include determining a transport block size (TBS) for a multicast transmission based on an overhead value for the G-RNTI and the downlink control information received for the G-RNTI. The method may include decoding the multicast transmission based on the MCS table and the TBS.

In an aspect, selecting the MCS table for the G-RNTI may include selecting a default MCS table for all multicast transmissions for the G-RNTI.

In another aspect, selecting the MCS table for the G-RNTI may include receiving a configuration of the MCS table for the G-RNTI. The configuration of the MCS table for the G-RNTI may be received via system information. The configuration of the MCS table for the G-RNTI may be received via a unicast radio resource configuration message.

In another aspect, selecting the MCS table for the G-RNTI may include selecting a UE-specific MCS table for G-RNTI transmissions scheduled in a UE-specific search space and selecting a default or configured table for G-RNTI transmissions scheduled in a common search space.

In an aspect, determining the TBS for the multicast transmission based on the overhead value may include determining the TBS for the multicast transmission based on the overhead value being a default value.

In an aspect, determining the TBS for the multicast transmission based on the overhead value may include receiving a configuration of a UE-specific overhead value. Each UE receiving the multicast transmission may be configured with a same UE-specific overhead value. The configuration of the UE-specific overhead value may be received via a unicast radio resource configuration message.

In another aspect, determining the TBS for the multicast transmission based on the overhead value for the G-RNTI may be based on a configured overhead value in the configuration for multicast transmissions on a system information block.

In an aspect, the method may further include determining to apply limited buffer rate matching (LBRM) to the multicast transmission. The method may further include determining a maximum TBS for the G-RNTI, the method may further include applying a LBRM code rate to the maximum TBS to determine a LBRM TBS. Determining the maximum TBS may include receiving a signaled maximum TBS. Determining the maximum TBS may include determining the maximum TBS based on one or more of a number of layers for the G-RNTI, a maximum modulation order for the G-RNTI, and a number of physical resource blocks for the LBRM based on a bandwidth part for the G-RNTI.

In an aspect, decoding the multicast transmission based on the MCS and the TBS may include rate matching a transport block to physical downlink shared channel (PDSCH) resources based on a rate matching pattern for the G-RNTI. The rate matching pattern for the G-RNTI may be indicated by the downlink control information.

In an aspect, where the UE monitors a physical downlink control channel (PDCCH) candidate for the G-RNTI with aggregation level 8, the rate matching the transport block may include rate matching the transport block around resources corresponding to a PDCCH candidate with aggregation level 16.

In an aspect, the rate matching pattern does not rate match the transport block around resources for a cell specific reference signal.

In another aspect, the rate matching pattern indicates rate matching around resources for a cell specific reference signal.

In an aspect, the configuration for the G-RNTI indicates the cell specific reference signal.

In an aspect, the rate matching pattern indicates rate matching around a configured set of zero power channel status information reference signal (ZP-CSI-RS) for the G-RNTI.

In an aspect, the method further includes receiving a media access control-control element (MAC-CE) using the G-RNTI with a HARQ process identifier indicating that a semi-persistent ZP-CSI-RS is activated; and rate matching around the semi-persistent ZP-CSI-RS after receiving a PDSCH for the G-RNTI scheduled with the HARQ process identifier and a new data indicator (NDI) being flipped. The configuration for the G-RNTI may indicate the ZP-CSI-RS.

In another aspect, the rate matching pattern does not rate match the transport block around resources for a semi-persistent ZP-CSI-RS for the G-RNTI.

In an aspect, the disclosure provides an apparatus for wireless communication. The apparatus may include a memory and at least one processor coupled to the memory. The at least one processor may be configured to receive, at a UE, one or more configurations for multicast transmissions, each configuration associated with a G-RNTI. The at least one processor may be configured to select a MCS table for the G-RNTI. The at least one processor may be configured to receive downlink control information associated with the G-RNTI. The at least one processor may be configured to determine a TBS for a multicast transmission based on an overhead value for the G-RNTI and the downlink control information received for the G-RNTI. The at least one processor may be configured to decode the multicast transmission based on the MCS table and the TBS.

In another aspect, the disclosure provides an apparatus for wireless communication. The apparatus may include means for receiving, at a UE, one or more configurations for multicast transmissions, each configuration associated with a G-RNTI. The apparatus may include means for selecting a MCS table for the G-RNTI. The apparatus may include means for downlink control information associated with the G-RNTI. The apparatus may include means for determining a TBS for a multicast transmission based on an overhead value for the G-RNTI and the downlink control information received for the G-RNTI. The apparatus may include means for decoding the multicast transmission based on the MCS table and the TBS.

In another aspect, the present disclosure provides a non-transitory computer-readable medium storing computer executable code. The code when executed by a processor causes the processor to receive, at a UE, one or more configurations for multicast transmissions, each configuration associated with a G-RNTI. The code when executed by a processor causes the processor to select a MCS table for the G-RNTI. The code when executed by a processor causes the processor to receive downlink control information associated with the G-RNTI. The code when executed by a processor causes the processor to determine a TBS for a multicast transmission based on an overhead value for the G-RNTI and the downlink control information received for the G-RNTI. The code when executed by a processor causes the processor to decode the multicast transmission based on the MCS table and the TBS. The computer-readable medium may be a non-transitory computer-readable medium.

In an aspect of the disclosure, a method, a computer-readable medium, and an apparatus (e.g., a base station) are provided. The method may include transmitting, by a base station, one or more configurations for multicast transmissions to one or more user equipment (UE), each configuration associated with a group radio network temporary identifier (G-RNTI). The method may include selecting a modulation and coding scheme (MCS) table for the G-RNTI. The method may include transmitting downlink control information associated with the G-RNTI to the one or more UE. The method may include determining a transport block size (TBS) for a multicast transmission based on an overhead value for the G-RNTI and the downlink control information for the G-RNTI. The method may include transmitting the multicast transmission based on the MCS table and the TBS.

In an aspect, the disclosure provides an apparatus for wireless communication. The apparatus may include a memory and at least one processor coupled to the memory. The at least one processor may be configured to transmit, by a base station, one or more configurations for multicast transmissions to one or more user equipment (UE), each configuration associated with a group radio network temporary identifier (G-RNTI). The at least one processor may be configured to select a modulation and coding scheme (MCS) table for the G-RNTI. The at least one processor may be configured to transmit downlink control information associated with the G-RNTI to the one or more UE. The at least one processor may be configured to determine a transport block size (TBS) for a multicast transmission based on an overhead value for the G-RNTI and the downlink control information for the G-RNTI. The at least one processor may be configured to transmit the multicast transmission based on the MCS table and the TBS.

In another aspect, the disclosure provides an apparatus for wireless communication. The apparatus may include means for transmitting, by a base station, one or more configurations for multicast transmissions to one or more user equipment (UE), each configuration associated with a group radio network temporary identifier (G-RNTI). The apparatus may include means for selecting a modulation and coding scheme (MCS) table for the G-RNTI. The apparatus may include means for transmitting downlink control information associated with the G-RNTI to the one or more UE. The apparatus may include means for determining a transport block size (TBS) for a multicast transmission based on an overhead value for the G-RNTI and the downlink control information for the G-RNTI. The apparatus may include means for transmitting the multicast transmission based on the MCS table and the TBS.

In another aspect, the present disclosure provides a non-transitory computer-readable medium storing computer executable code. The code when executed by a processor causes the processor to transmit, by a base station, one or more configurations for multicast transmissions to one or more user equipment (UE), each configuration associated with a group radio network temporary identifier (G-RNTI). The code when executed by a processor causes the processor to select a modulation and coding scheme (MCS) table for the G-RNTI. The code when executed by a processor causes the processor to transmit downlink control information associated with the G-RNTI to the one or more UE. The at least one processor may be configured to determine a transport block size (TBS) for a multicast transmission based on an overhead value for the G-RNTI and the downlink control information for the G-RNTI. The code when executed by a processor causes the processor to transmit the multicast transmission based on the MCS table and the TBS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
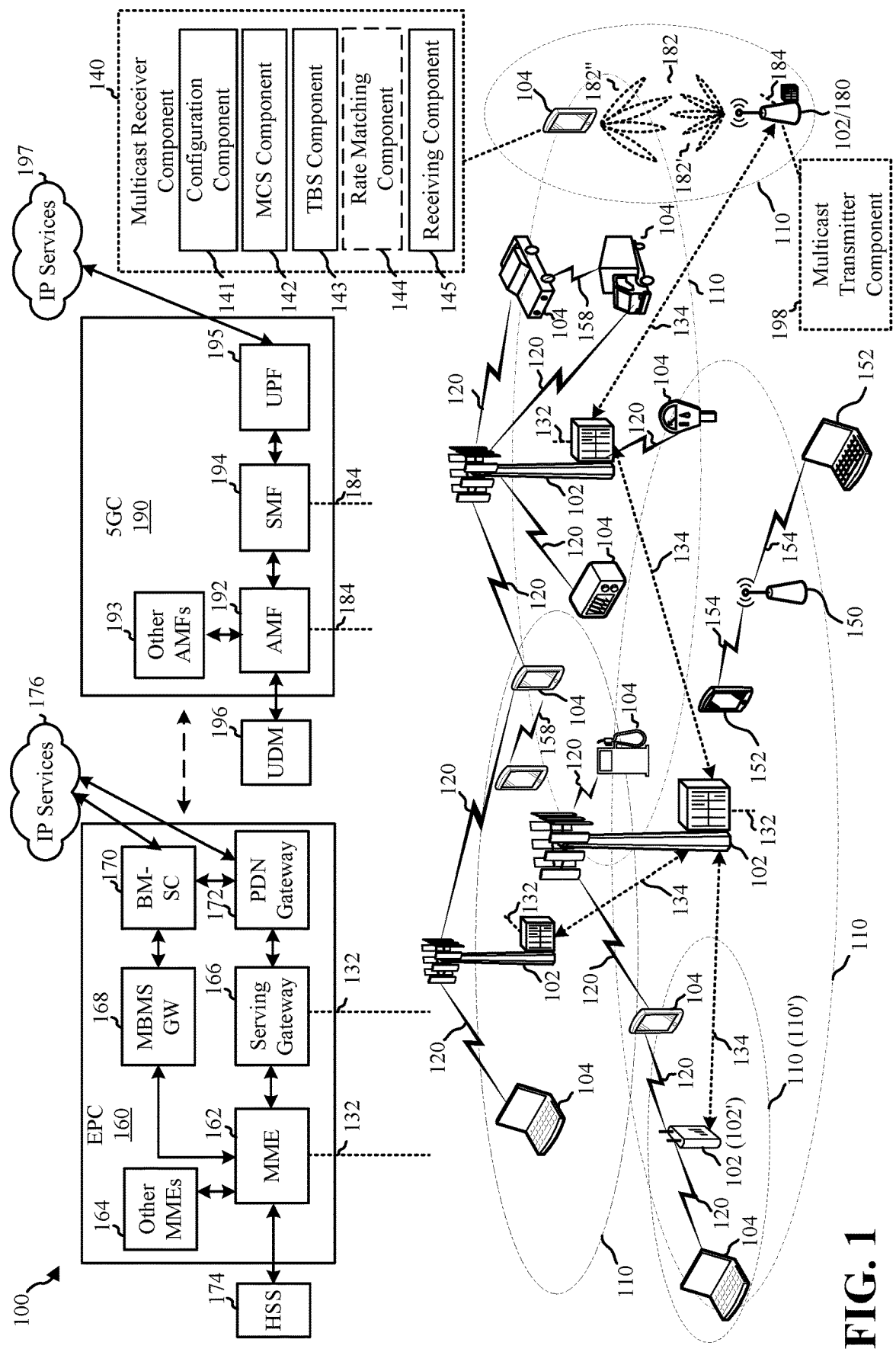
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

A multicast transmission may refer to a transmission that is intended for a group of devices. A multicast transmission in 5G NR may utilize existing frame structures and channels to schedule and transmit data to the group of devices. In an aspect, the group of devices may be associated with a multicast identifier. For example, the multicast identifier may be a radio network temporary identifier (RNTI) and may be referred to as a group RNTI or G-RNTI. The G-RNTI may be used to schedule downlink transmissions in a similar manner as other RNTIs that are used for unicast transmissions. That is, a base station may transmit a downlink control information (DCI) on a physical downlink control channel (PDCCH) having a cyclic redundancy check (CRC) scrambled with the G-RNTI. Each device (e.g., user equipment (UE)) in the group of devices may monitor a search space on the PDCCH to receive the DCI and decode the DCI using the G-RNTI. The UEs may then each receive a physical downlink shared channel (PDSCH) transmission scheduled by the DCI that carries the data for the multicast transmission.

The use of a G-RNTI to schedule transmissions for multiple devices in a multicast group may raise issues in comparison to unicast transmissions. For example, modulation and coding scheme (MCS) is typically determined for each UE based on channel conditions for unicast transmissions. In a multicast scenario, the different UEs in the group are likely to experience different channel conditions. Accordingly, a mechanism for the UEs to consistently determine the MCS may facilitate multicast transmissions. Similarly, the MCS is related to transport block size (TBS), which may be based on the MCS and other factors. Accordingly, a mechanism for the UEs to consistently determine transport block size may facilitate multicast transmissions. As another example, rate matching may be used to map the transport block to physical resources. Accordingly, the UEs may use the same rate matching pattern for the multicast transmissions. In another aspect, limited buffer rate matching (LBRM) may be used for the multicast transmission. Accordingly, a mechanism for the UEs to consistently determine a maximum transport block size for applying LBRM may facilitate multicast transmissions.

The present disclosure provides mechanisms for UEs to determine transmission properties including MCS and TBS for multicast transmissions using a G-RNTI. A UE may select a MCS table for the G-RNTI. The UE may determine a TBS for the G-RNTI based on an overhead value for the G-RNTI. The UE may receive a multicast transmission based on the MCS table and the TBS. In an aspect, where LBRM applies to the multicast transmission, the UE may determine a maximum TBS for the G-RNTI and apply a LBRM code rate to the maximum TBS to determine a LBRM TBS for the multicast transmission. In another aspect, the UE may determine a rate matching pattern for the G-RNTI.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. In an aspect, the term non-transitory computer-readable medium excludes transitory signals.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a multicast receiver component 140 that receives multicast transmissions based on a G-RNTI. The multicast receiver component 140 may include a configuration component 141 that receives configurations for a G-RNTI, a MCS component 142 that selects an MCS table for the G-RNTI, a TBS component 143 that determines a TBS based on an overhead value for the G-RNTI, and a receiving component 145 that decodes the multicast transmission based on the MCS table and the TBS. The multicast receiver component 140 may optionally include a rate matching component 144 that may perform LBRM and/or rate matching based on a rate matching pattern. In an aspect, the base station 102 may include a multicast transmitter component 198 that performs the actions of the base station as described herein.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2B:
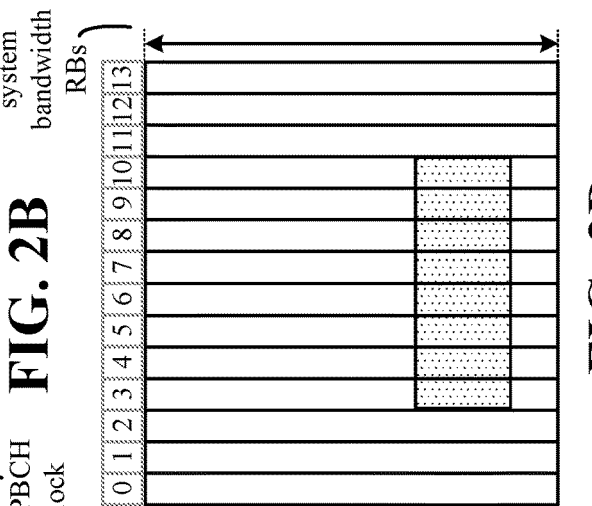
FIG. 2B is a diagram illustrating an example of DL channels within a subframe, in accordance with certain aspects of the present description.
Figure 2D:
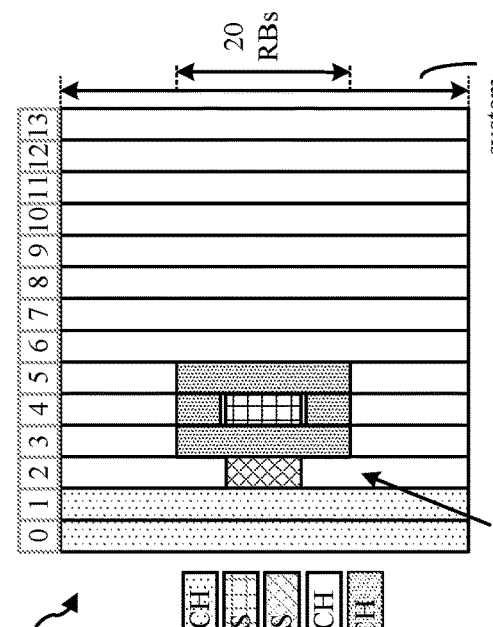
FIG. 2D is a diagram illustrating an example of a subframe, in accordance with certain aspects of the present description.
Figure 2A:
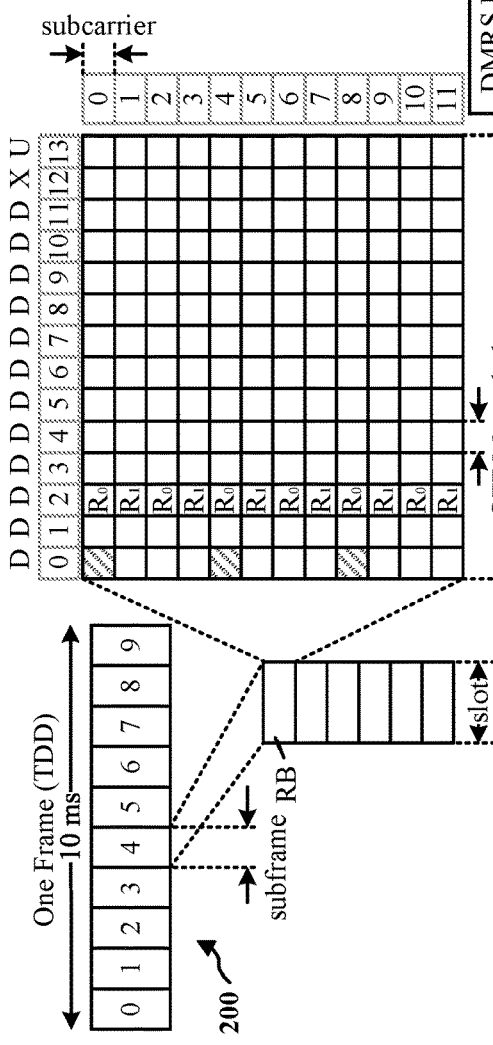
FIG. 2A is a diagram illustrating an example of a first frame, in accordance with certain aspects of the present description.
Figure 2C:
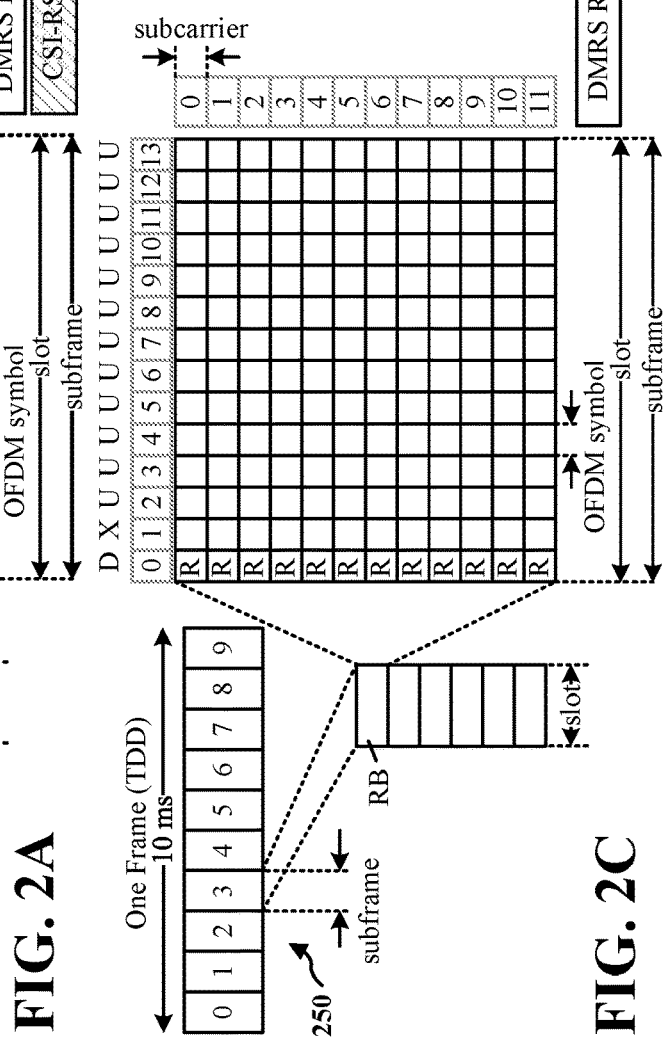
FIG. 2C is a diagram illustrating an example of a second frame, in accordance with certain aspects of the present description.

FIGS. 2A-2D are resource diagrams illustrating example frame structures and channels that may be used for multicast transmissions to a UE 104 including a multicast receiver component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
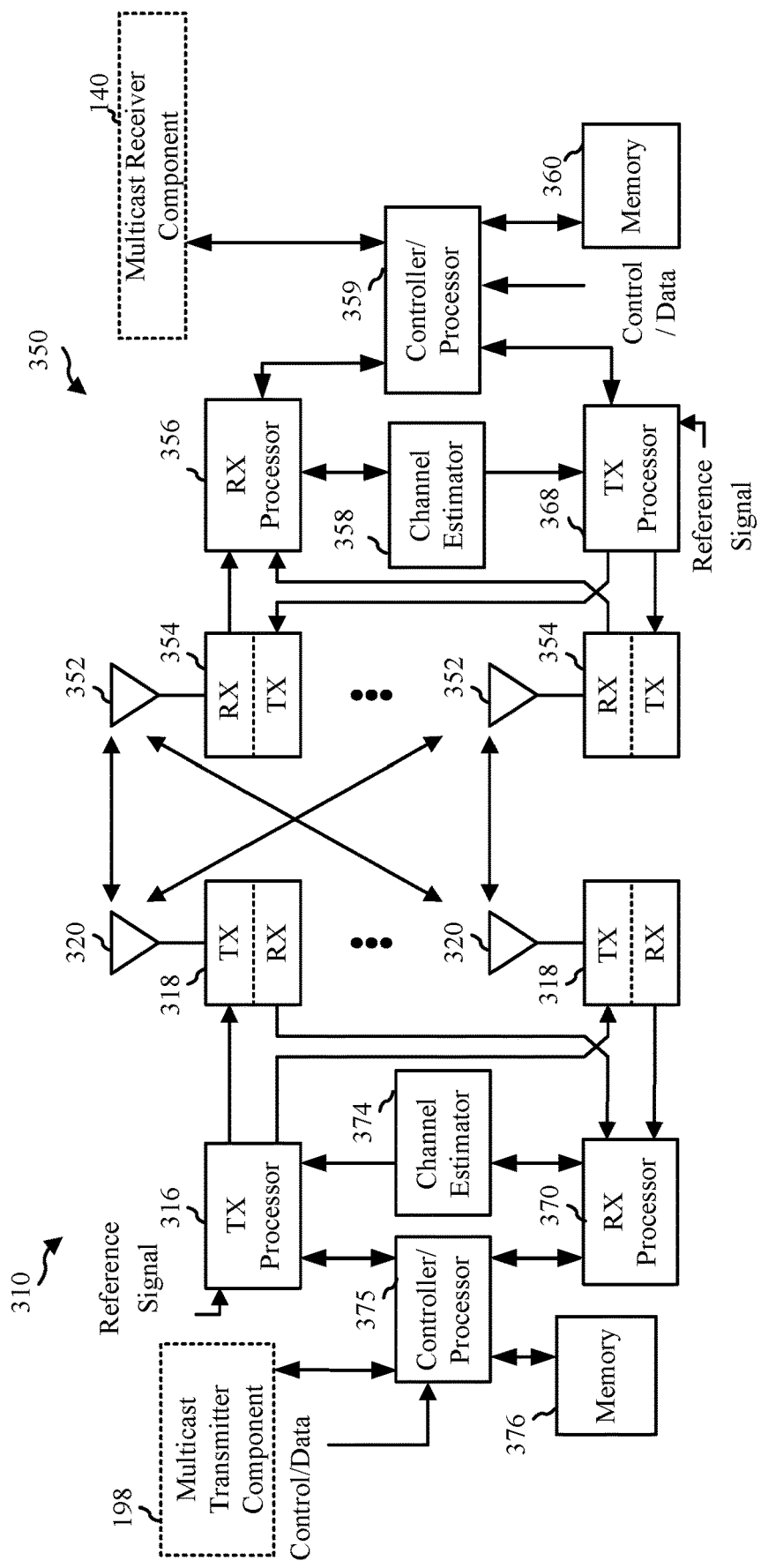
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multicast receiver component 140 of FIG. 1.

At least one of the TX processor 316, the RX processor 370, and the controller/processor 375 may be configured to perform aspects in connection with the multicast transmitter component 198 of FIG. 1.

Figure 4:
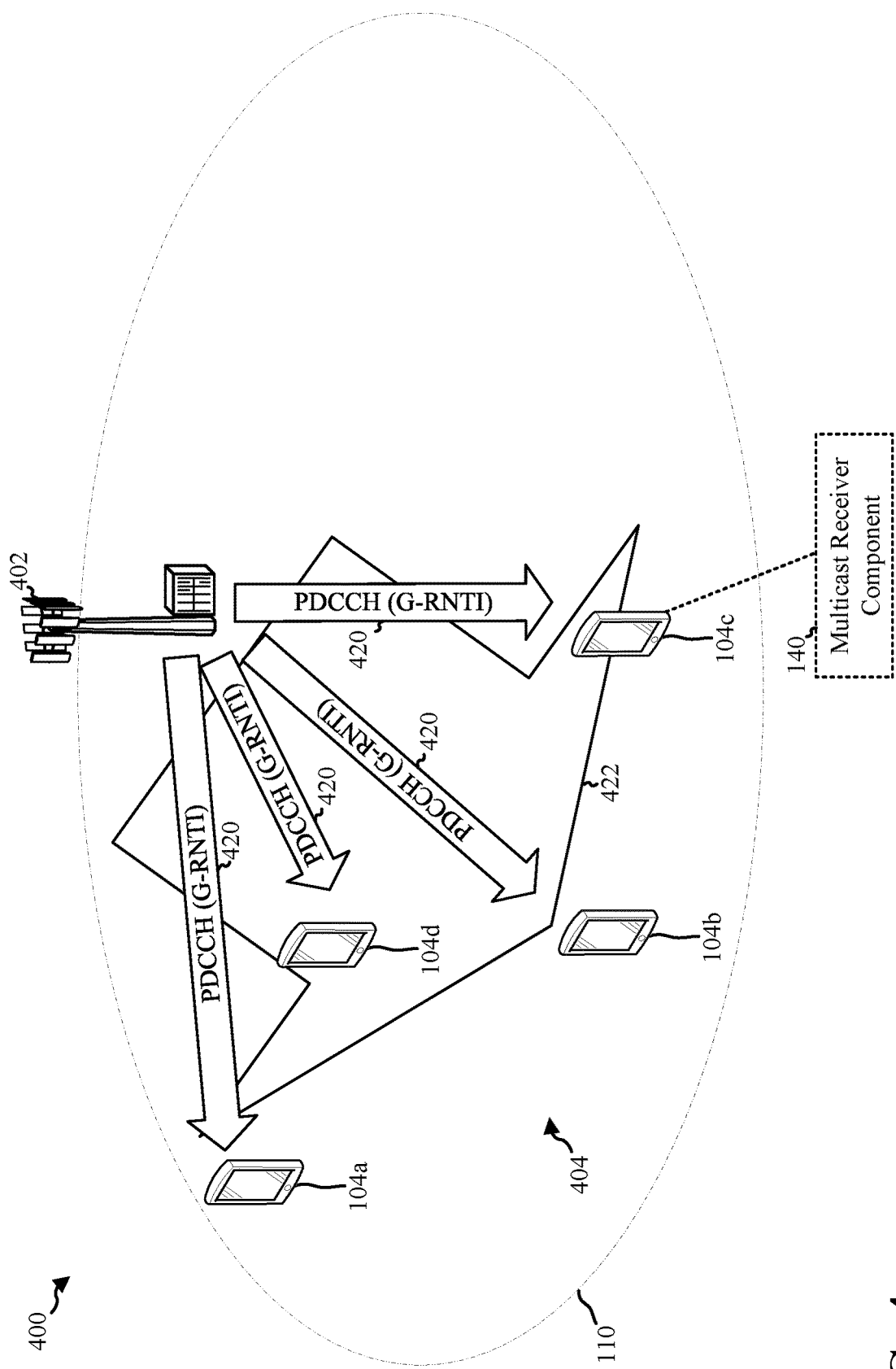
FIG. 4 is a schematic diagram illustrating an example configuration for a serving cell transmitting a multicast transmission to a group of UEs, in accordance with certain aspects of the present description.

FIG. 4 is an example scenario for multicast transmissions from a base station 402 to a group 404 of UEs 104 that includes UEs 104a, 104b, 104c, 104d. Each of the UEs 104 may be an example of the UE 104 and may include a multicast receiver component 140. Each of the UEs 104 may be within the coverage area 110 of the base station 102 and may be configured with the same G-RNTI for multicast transmissions. For example, as each UE 104 requests to receive a transmission (e.g., a live streaming video), the base station 102 may configure the respective UE 104 with the G-RNTI. Additionally, as discussed in further detail below, the base station 102 may provide information about one or more G-RNTIs within system information (e.g., in a MIB/SIB) or in a unicast radio resource control (RRC) configuration message. In some implementations, some of the information about the one or more G-RNTIs may be included within a portion of the multicast transmission.

When the base station 102 has a packet for the multicast transmission, the base station 102 may transmit one or more PDCCH 420 to schedule a multicast transmission 422 on the PDSCH. For example, the base station 102 may transmit a single PDCCH 420 in a common search space (CSS) that all of the UEs 104 receive. Alternatively, the base station 102 may transmit a PDCCH 420 in a UE-specific search space (USS) for a specific UE. Each PDCCH 420 may carry a DCI scrambled with the G-RNTI. Accordingly, a UE 104 receiving the PDCCH 420 may determine that the DCI is scheduling a multicast transmission based on the G-RNTI. As discussed in further detail below, each UE 104 may determine the same transmission properties (e.g., MCS, TBS, and rate matching pattern) based on the G-RNTI. The multicast transmission 422 may include a multicast control channel (MCCH) and one or more multicast transport channels (MTCH). The MCCH may include a configuration for receiving the MTCH. In some implementations, the G-RNTI may be for decoding the MCCH. In some implementations, the MCCH may include a second G-RNTI for decoding the MTCH. The MCCH may include additional configuration information associated with the second G-RNTI such as the MCS, TBS, and rate matching pattern for the MTCH. Each UE 104 may use the second G-RNTI and associated configuration information to decode the MTCH. Accordingly, each UE 104 may receive the same multicast transmission 422.

Figure 5:
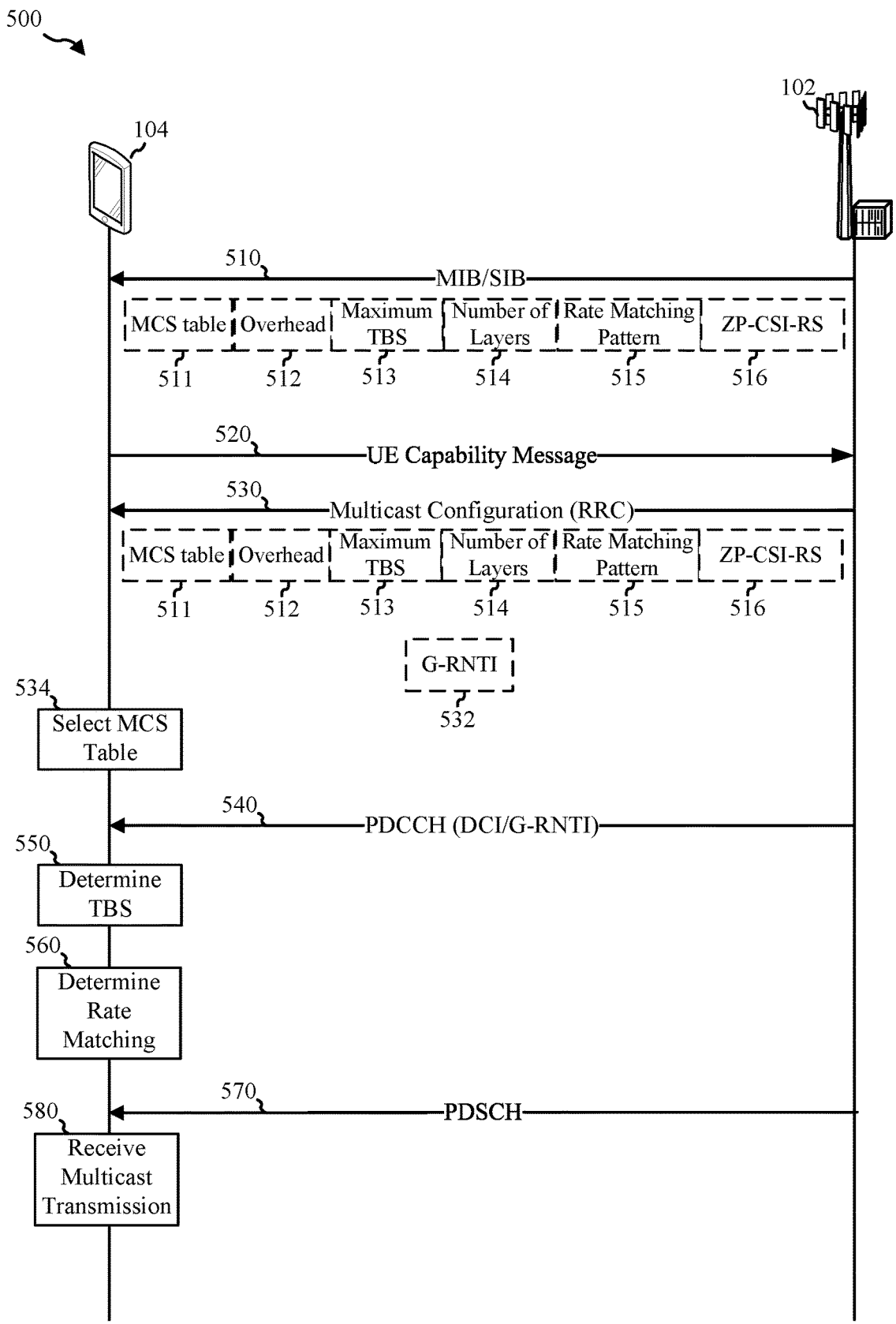
FIG. 5 is a message diagram including example communications and processing by a UE and base station for receiving a multicast transmission, in accordance with certain aspects of the present description.

FIG. 5 is a message diagram 500 illustrating example messages that may be transmitted between a UE 104 and a base station 102 for scheduling and receiving a multicast message on a PDSCH.

The base station 102 may optionally transmit a system information message (e.g., MIB/SIB 510) that indicates parameters to use for a G-RNTI. For example the MIB/SIB 510 may indicate a MCS table 511 for the G-RNTI, an overhead 512 for G-RNTI transmissions, a maximum TBS 513 for G-RNTI, a number of layers 514 for G-RNTI, a rate matching pattern 515 for G-RNTI, and/or a configuration of a set of zero power channel state information reference signal (ZP-CSI-RS) 516.

The UE 104 may transmit a UE capability message 520. For example, the UE capability message 520 may indicate that the UE 104 is capable of receiving multicast transmissions using a G-RNTI.

The base station 102 may transmit a multicast configuration 530 to the UE 104. The multicast configuration 530 may be a unicast transmission such as an RRC configuration message. The base station 102 may send the same configuration information to each UE 104 in the group 404 via separate unicast messages. The multicast configuration 530 may include any of the information that may be transmitted via the MB/SIB 510. That is, the multicast configuration 530 may indicate a MCS table 511 for the G-RNTI, an overhead 512 for G-RNTI transmissions, a maximum TBS 513 for G-RNTI, a number of layers 514 for G-RNTI, a rate matching pattern 515 for G-RNTI, and/or a set of zero power channel state information reference signals (ZP-CSI-RS) 516. In an aspect, the multicast configuration 530 may include the G-RNTI 532 for the multicast group 404.

At block 534, the UE 104 may select the MCS table to use for multicast transmissions for the G-RNTI. In an aspect, the UE 104 may be configured with a limited number of MCS tables. For example, an MCS table may be defined by a maximum modulation level. For example, 3GPP Release 15 defines MCS tables for 64 QAM, 256 QAM, and 64 QAM low spectral efficiency. If a UE 104 is capable of higher order modulation such as 1024 QAM, an MCS table for 1024 QAM may be defined. For unicast transmissions using C-RNTI, the UE 104 may select or be configured with an MCS table, for example, based on average channel conditions. For a multicast transmission, each UE 104 in the multicast group 404 may use the same MCS table based on a selection rule. For a first option, a default table may be defined for multicast transmissions with G-RNTI. For example, a 64 QAM MCS table may be selected as the default table for reliable communications with different channel conditions. The default table may be defined in a standard or regulation. As another option, the base station 102 may configure a MCS table for multicast transmissions with G-RNTI. For example, the base station 102 may transmit the MCS table 511 on either the MIB/SIB 510 or the multicast configuration 530. As a third option, the UE 104 may select the default MCS table or the signaled MCS table 511 when the G-RNTI is in a common search space, or may select a UE specific MCS table when the G-RNTI is in a UE specific search space. Accordingly, the base station 102 may schedule initial transmissions in the common search space such that all of the UEs 104 in the multicast group 404 receive the same multicast transmission. If one or more UEs do not correctly receive the multicast transmission, the base station 102 may, for example, use the UE specific search space to schedule retransmissions for the one or more UEs using a specific MCS.

The base station 102 may transmit a PDCCH 540 to schedule a multicast transmission. More specifically, the base station 102 may transmit a DCI on PDCCH resources using the G-RNTI to scramble the CRC portion of the DCI. The UE 104 may receive the DCI by performing blind decoding on PDCCH resources of a configured search space. The DCI may include information for scheduling the multicast transmission based on a DCI format (e.g., formats 1_0 or 1_1). For example, the DCI may include an identifier of the DCI format, a frequency domain resource assignment, a random access preamble index, an uplink/supplemental uplink indicator, a SS/PBCH index, a PRACH mask index, a time domain resource assignment, a VRB-to-PRB mapping, a MCS, a new data indicator (NDI), a redundancy version, a HARQ process number, a downlink assignment index, a TPC command for scheduled PUCCH, a PUCCH resource indicator, a PDCH-to-HARQ feedback timing indicator, a carrier indicator, a bandwidth part indicator, a PRB bundling size indicator, a rate matching indicator, a ZP-CSI-RS trigger, antenna ports, a transmission configuration indication, an SRS request, a code block group (CBG) transmission information, a CBG flushing out information, and/or a DMRS sequence initialization.

At block 550, the UE 104 may determine the TBS. For example, the UE 104 may determine the TBS based on the information in the DCI as a number of resource elements, NRE. In an aspect, the TBS may be determined based at least on a reference number of resource elements within a physical resource bloc, which may be obtained according to the following equation:

$$N'_{RE}=N_{sc}^{RB} \cdot N_{symb}^{sh}-N_{DMRS}^{PRB}-N_{oh}^{PRB},$$

where $N_{sc}^{RB}$ is a number of subcarriers in a resource block, $n_{symb}^{sh}$ is a number of symbols, $N_{DMRS}^{PRB}$ is a number of resource elements allocated to DMRS within a physical resource block, and $N_{oh}^{PRB}$ is a number of resource elements assumed for overhead within a physical resource block for overhead. $N_{sc}^{RB}$, $n_{symb}^{sh}$, and $N_{DMRS}^{PRB}$ may be determined based on the DCI, on a frame format, or on a constant defined in the specification. In an aspect, for a multicast transmission using G-RNTI, the UE 104 may assume the overhead is a fixed value such as 0, but a standard could define a different fixed overhead. In another aspect, the base station 102 may configure the value of $N_{oh}^{PRB}$ in a configuration, for example, as the overhead 512, which may be transmitted on the MIB/SIB 510 or the multicast configuration 530. If the multicast configuration 530 is transmitted as a unicast message, the base station 102 may indicate the same value of $N_{oh}^{PRB}$ for each UE 104 in the group 404.

At block 560, the UE 104 may determine rate matching for a physical channel associated with a G-RNTI. In an aspect, the UE 104 may use LBRM or a rate matching pattern. As discussed in further detail below, LBRM may be based on a maximum TBS. In an aspect, the maximum TBS may be signaled by the base station as the maximum TBS 513 on either the MIB/SIB 510 or the multicast configuration 530. In another aspect, the maximum TBS may be based on a number of layers, a maximum modulation order, and a number of PRBs for LBRM. The number of layers may be fixed (e.g., 1), signaled as the number of layers 514, or selected based on a number of MIMO layers supported for multicast transmissions using G-RNTI. The maximum modulation order may be fixed (e.g., to 6 corresponding to 64 QAM) or based on the selected MCS table. The number of PRBs for LBRM may be based on a bandwidth part (BWP) configured for multicast transmissions using G-RNTI (e.g., based on the largest configured bandwidth part for multicast transmissions). The rate matching pattern may define one or more resources that are not available for PDSCH and that the UE 104 may rate match around. In one example, the one or more rate matching pattern for G-RNTI may be separately configured (e.g. by SIB/MIB or by unicast RRC) from the one or more rate matching pattern for unicast transmissions.

The base station 102 may transmit the multicast transmission on the PDSCH 570 according to the PDCCH 540. At block 580, the UE 104 may receive the multicast transmission on the PDSCH 570 based on the determined parameters for MCS, TBS, and rate matching for the G-RNTI. In some implementations, where the multicast transmission 422 includes an MCCH and a MTCH, the UE 104 may decode the MCCH based on the determined parameters for MCS, TBS, and rate matching for the first G-RNTI. In some implementations, the MCCH may include the second G-RNTI for decoding the MTCH. The UE 104 may repeat blocks 550 and 560 for determining the parameters for MCS, TBS, and rate matching for the second G-RNTI. In some implementations, the MCCH may include the parameters for MCS, TBS, and rate matching for the second G-RNTI.

Figure 6:
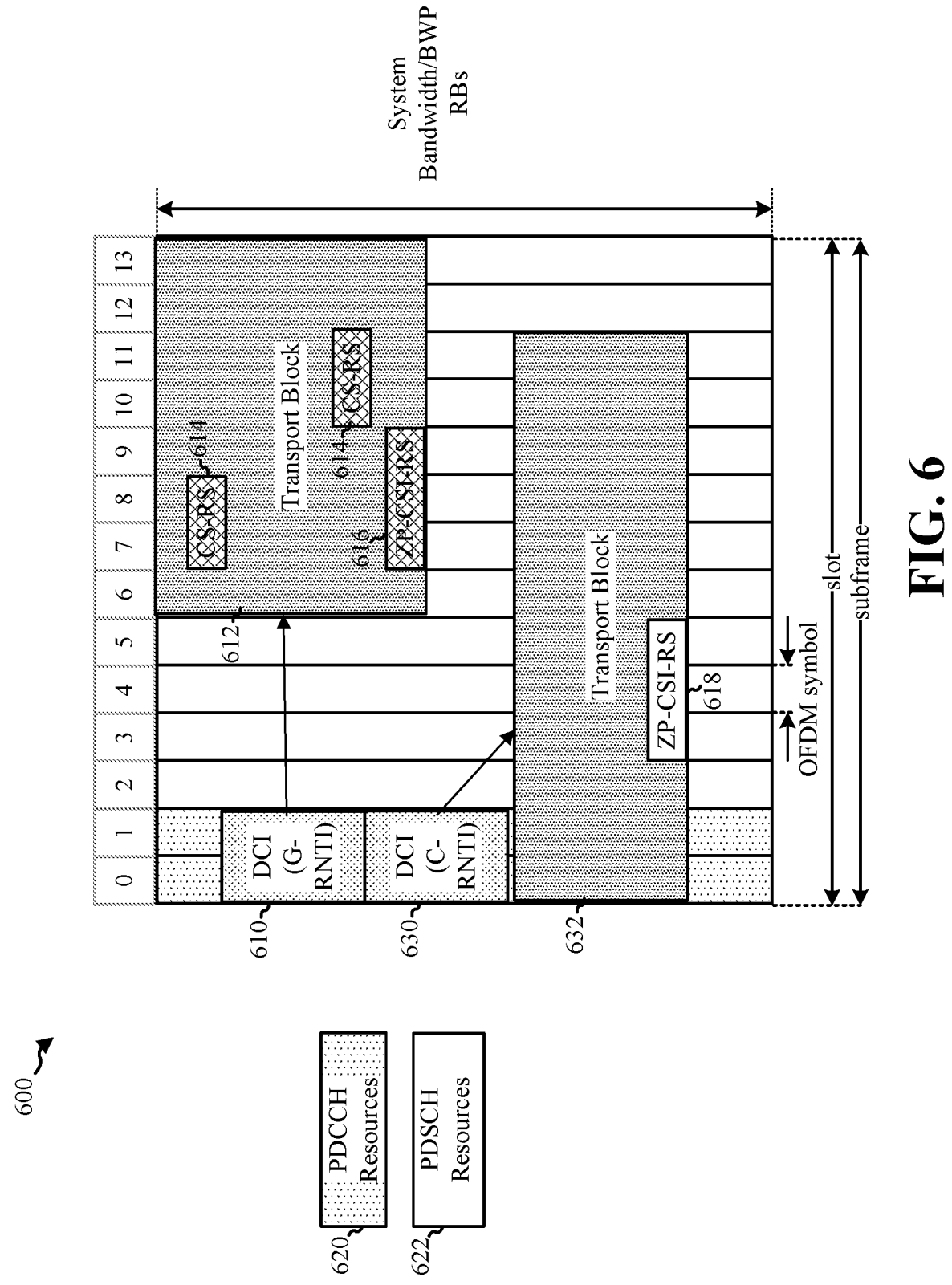
FIG. 6 is a resource diagram illustrating an example downlink control information and a corresponding transport block for a multicast transmission, in accordance with certain aspects of the present description.

FIG. 6 is a resource diagram 600 including DCIs 610, 630 transmitted on PDCCH resources 620 and corresponding transport blocks 612, 632 transmitted on PDSCH resources 622. A DCI 610 may use the G-RNTI to schedule a transport block 612 for a multicast transmission. The DCI 610 may be received by any UE 104 in the group 404 that is configured with the G-RNTI. The DCI 610 may indicate frequency domain and time domain resources for the transport block 612. Some of the resource elements within the transport block 612 may be unavailable because the resource elements are used for another purpose. For example, one or more CSI-RS 614 may be present within the transport block 612. Similarly, a ZP-CSI-RS may be present within the transport block 612. Rate matching may be used to map the bits of the transport block around the unavailable resources. Conventionally, dynamic rate matching is not supported for broadcast channels. When receiving PDSCH scheduled by PDCCH with CRC scrambled by C-RNTI, MCS-C-RNTI, CS-RNTI, or PDSCH with SPS the REs corresponding to configured or dynamically indicated resources are not available for PDSCH. In general, for broadcasts using P-RNTI/SI-RNTI/RA-RNTI, the transmission is with low modulation (e.g., QPSK only) and code rate, so puncturing may be acceptable. For mixed mode multicast transmissions, however, the spectral efficiency may be much higher in some cases (e.g. broadcast of 4k video), so optimized rate matching may improve performance.

In an aspect, multicast transmissions for G-RNTI may have different rules for rate matching than unicast transmissions. For example, when the UE 104 receives a unicast transport block 632 based on the DCI 630 including a C-RNTI, the UE 104 may rate match around the ZP-CSI-RS 618. The UE 104 may, however, determine that the ZP-CSI-RS 616 is puncturing the transport block 612.

For multicast transmissions using G-RNTI, the base station 102 may configure an alternative set of rate matching patterns (e.g., rate matching pattern 515) than for unicast. The rate matching patterns 515 may be configured separately from the patterns for the other RNTIs, and can be transmitted as unicast or SIB. The base station 102 may signal activation or deactivation of the rate matching pattern 515 in the DCI 610.

In an aspect, resources belonging to a PDCCH resource set may be reused for a PDSCH. However, there may be ambiguity between candidates of aggregation level 8 and aggregation level 16 (e.g. a UE may detect an aggregation level 8 candidate when the gNB transmits an aggregation level 16). If a UE monitors PDCCH candidates of aggregation levels 8 and 16 with the same starting CCE index in non-interleaved CORESET spanning one OFDM symbol and if a detected PDCCH scheduling the PDSCH has aggregation level 8, the resources corresponding to the aggregation level 16 PDCCH candidate are not available for the PDSCH. In an aspect, the UE 104 may apply an intra-RNTI rule such that if the UE 104 monitors for G-RNTI with aggregation level 8/16, and detects a PDCCH, the resources corresponding to the other aggregation level are not available for PDSCH associated with G-RNTI. That is, the UE 104 may rate match around the resources for the other aggregation level.

If a PDSCH scheduled by a PDCCH would overlap with resources in the CORESET containing the PDCCH, the resources corresponding to a union of the detected PDCCH that scheduled the PDSCH and associated PDCCH DM-RS are not available for the PDSCH. When the precoder granularity configured in a CORESET where the PDCCH was detected is equal to all contiguous RBs, the associated PDCCH DM-RS are DM-RS in all REGs of the CORESET for the G-RNTI. Otherwise, the associated DM-RS are the DM-RS in REGs of the PDCCH.

In an aspect, LTE cell-specific reference signal (CRS) rate matching may be configured in a UE-specific manner. The base station 102 may signal CRS rate matching parameters for multicast transmissions using G-RNTI that are applicable to all UEs 104 in the multicast group 404. In another aspect, the UE 104 may ignore CRS rate matching for multicast transmissions using G-RNTI, regardless of a UE-specific configuration. Similarly, ZP-CSI-RS resources may be dynamically configured. The base station 102 may configure a separate set of ZP-CSI-RS 516 for G-RNTI using either MIB/SIB 510 or multicast configuration 530. For semi-persistent ZP-CSI-RS that is activated or deactivated by a MAC control element (MAC-CE), the MAC-CE for the multicast transmission may not be received by all UEs 104 in the group 404. In an aspect, an action time for activating or deactivating rate matching around semi-persistent ZP-CSI-RS may be based on a first PDSCH associated with the same G-RNTI HARQ process with flipped NDI and in slot $n+3N_{slot}^{subframe,\mu}+1$. That is, after receiving the MAC-CE activating ZP-CSI-RS, the UE 104 may wait for a PDSCH indicating new data before rate matching around the ZP-CSI-RS. In another aspect, semi-persistent scheduling for ZP-CSI-RS may be disabled for G-RNTI transmissions, or the UE 104 may assume the multicast transmission is punctured by ZP-CSI-RS.

Figure 7:
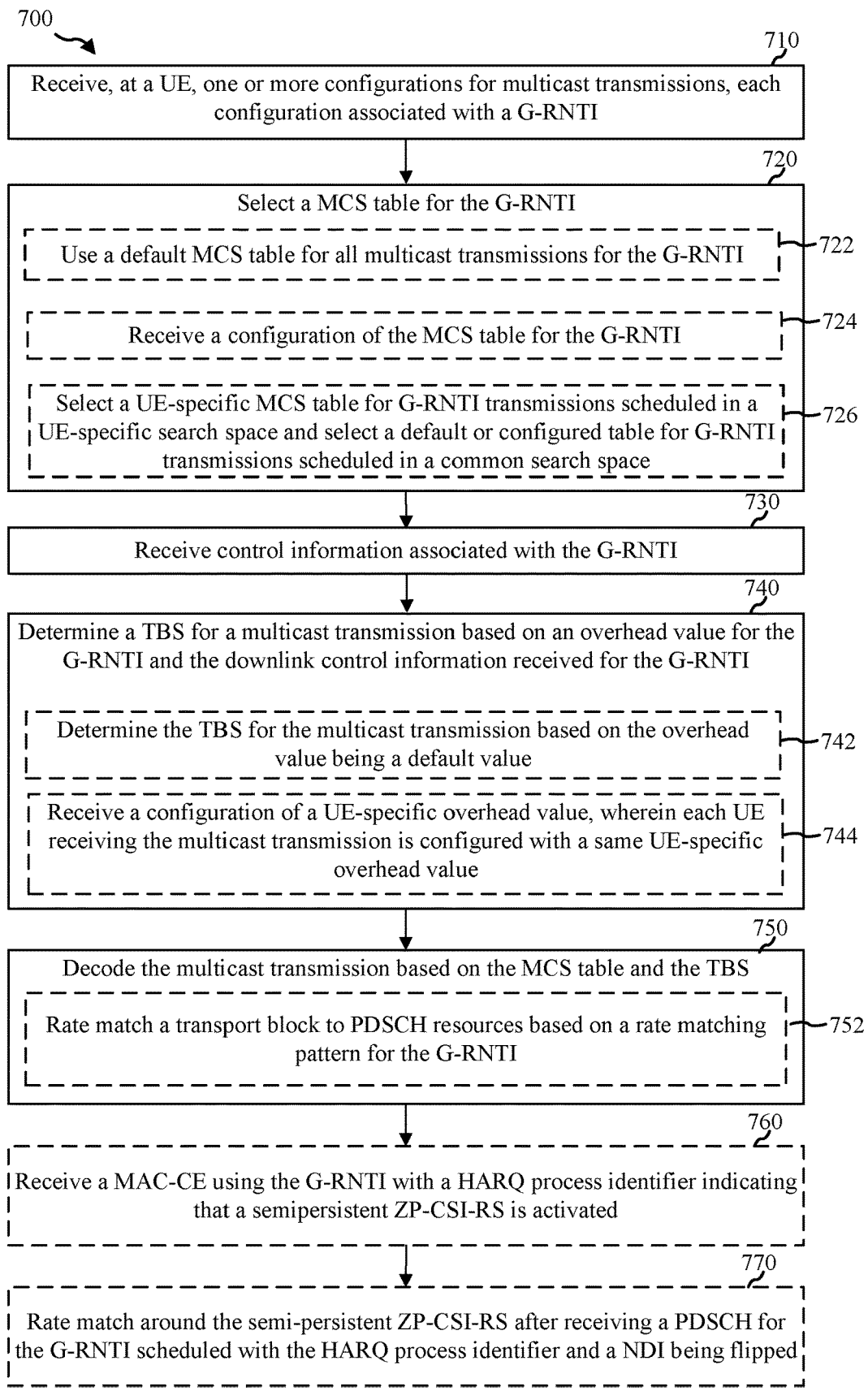
FIG. 7 is a flowchart of an example method of receiving a multicast transmission, in accordance with certain aspects of the present description.

FIG. 7 is a flowchart of a method 700 of wireless communication that may be performed by a UE (e.g., the UE 104, which may include the memory 360 and which may be the entire UE 104 or a component of the UE 104 such as the multicast receiver component 140, TX processor 368, the RX processor 356, and/or the controller/processor 359) for receiving a multicast transmission. The method 700 may be performed in communication with a base station 102 including the multicast transmitter component 198.

At block 710, the method 700 may include receiving, at a UE, one or more configurations for multicast transmissions, each configuration associated with a G-RNTI. In an aspect, for example, the UE 104, the TX processor 368, the RX processor 356, and/or the controller/processor 359 may execute the multicast receiver component 140 and/or the configuration component 141 to receive, at a UE, one or more configurations (e.g., MIB/SIB 510 or multicast configuration 530) for multicast transmissions, each configuration associated with a G-RNTI 532. Accordingly, the UE 104, the TX processor 368, the RX processor 356, and/or the controller/processor 359 executing the multicast receiver component 140 and/or the configuration component 141 may provide means for receiving, at a UE, one or more configurations for multicast transmissions, each configuration associated with a G-RNTI.

At block 720, the method 700 may include selecting a MCS table for the G-RNTI. In an aspect, for example, the UE 104, the TX processor 368, the RX processor 356, and/or the controller/processor 359 may execute the multicast receiver component 140 and/or the MCS component 142 to select the MCS table for the G-RNTI 532. For example, at sub-block 722, the MCS component 142 may optionally use a default MCS table for all multicast transmissions for the G-RNTI 532. As another example, at sub-block 724, the MCS component 142 may optionally receive a configuration (e.g., MCS table 511) of the MCS table for the G-RNTI 532. As another example, at sub-block 726, the MCS component 142 may optionally select a UE-specific MCS table for G-RNTI transmissions scheduled in a UE-specific search space and select a default or configured table for G-RNTI transmissions scheduled in a common search space. Accordingly, the UE 104, the TX processor 368, the RX processor 356, and/or the controller/processor 359 executing the multicast receiver component 140 and/or the MCS component 142 may provide means for selecting a MCS table for the G-RNTI.

At block 730, the method 700 may include receiving control information associated with the G-RNTI. In an aspect, for example, the UE 104, the TX processor 368, the RX processor 356, and/or the controller/processor 359 may execute the multicast receiver component 140 and/or the receiving component 145 to receive the control information (e.g., DCI 610) associated with the G-RNTI. For example, the receiving component 145 may perform blind decoding on the PDCCH resources 620 to detect the DCI 610. Accordingly, the UE 104, the TX processor 368, the RX processor 356, and/or the controller/processor 359 executing the multicast receiver component 140 and/or the receiving component 145 may provide means for receiving control information associated with the G-RNTI.

At block 740, the method 700 may include determining a TBS for a multicast transmission based on an overhead value for the G-RNTI and the downlink control information received for the G-RNTI. In an aspect, for example, the UE 104, the TX processor 368, the RX processor 356, and/or the controller/processor 359 may execute the multicast receiver component 140 and/or the TBS component 143 to determine the TBS for a multicast transmission based on an overhead value for the G-RNTI 532 and the downlink control information (e.g., DCI 610) received for the G-RNTI. For example, at sub-block 742, the TBS component 143 may optionally determine the TBS for the multicast transmission based on the overhead value being a default value (e.g., 0). As another example, at the sub-block 744, the TBS component 143 may optionally receive a configuration of a UE-specific overhead value (e.g., overhead 512). Each UE 104 receiving the multicast transmission is configured with a same UE-specific overhead value. In another aspect, the TBS component 143 may determine the overhead value is based on a configured overhead value (e.g., overhead 512) in the configuration for multi cast transmissions on a system information block (e.g., MIB/SIB 510). Accordingly, the UE 104, the TX processor 368, the RX processor 356, and/or the controller/processor 359 executing the multicast receiver component 140 and/or the TBS component 143 may provide means for determining a TBS for a multicast transmission based on an overhead value for the G-RNTI and the downlink control information received for the G-RNTI.

At block 750, the method 700 may include decoding the multicast transmission based on the MCS table and the TBS. In an aspect, for example, the UE 104, the TX processor 368, the RX processor 356, and/or the controller/processor 359 may execute the multicast receiver component 140 and/or the receiving component 145 to receive the multicast transmission 422 based on the MCS table and the TBS. Accordingly, the UE 104, the TX processor 368, the RX processor 356, and/or the controller/processor 359 executing the multicast receiver component 140 and/or the receiving component 145 may provide means for decoding the multicast transmission based on the MCS table and the TBS.

In an aspect, at sub-block 752, the block 750 may optionally include rate matching a transport block to PDSCH resources based on a rate matching pattern for the G-RNTI. In an implementation, for instance, the UE 104, the TX processor 368, the RX processor 356, and/or the controller/processor 359 may execute the multicast receiver component 140 and/or the rate matching component 144 to rate match a transport block to PDSCH resources based on a rate matching pattern for the G-RNTI. For example, the rate matching pattern for the G-RNTI may be indicated by a downlink control information scheduling the multicast transmission. In another aspect, where the UE monitors a PDCCH candidate for the G-RNTI with aggregation level 8, rate matching the transport block may include rate matching the transport block around resources corresponding to a PDCCH candidate with aggregation level 16. In one aspect, the rate matching pattern matches the transport block to resources for a cell specific reference signal. In another aspect, the rate matching pattern indicates rate matching around resources for a cell specific reference signal. In an aspect, the rate matching pattern indicates rate matching around a configured set of ZP-CSI-RS for the G-RNTI Further examples of rate matching are described below with respect to FIG. 8. Accordingly, the UE 104, the TX processor 368, the RX processor 356, and/or the controller/processor 359 executing the multicast receiver component 140 and/or the rate matching component 144 may provide means for rate matching a transport block to PDSCH resources based on a rate matching pattern for the G-RNTI.

At block 760, the method 700 may optionally include receiving a MAC-CE using the G-RNTI with a HARQ process identifier indicating that a semi-persistent ZP-CSI-RS is activated. In an aspect, for example, the UE 104, the TX processor 368, the RX processor 356, and/or the controller/processor 359 may execute the multicast receiver component 140 and/or the configuration component 141 to receive a MAC-CE using the G-RNTI with a HARQ process identifier indicating that a semi-persistent ZP-CSI-RS is activated. Accordingly, the UE 104, the TX processor 368, the RX processor 356, and/or the controller/processor 359 executing the multicast receiver component 140 and/or the configuration component 141 may provide means for receiving a MAC-CE using the G-RNTI with a HARQ process identifier indicating that a semi-persistent ZP-CSI-RS is activated.

At block 770, the method 700 may optionally include rate matching around the semi-persistent ZP-CSI-RS after receiving a PDSCH for the G-RNTI scheduled with the HARQ process identifier and a NDI being flipped. In an aspect, for example, the UE 104, the TX processor 368, the RX processor 356, and/or the controller/processor 359 may execute the multicast receiver component 140 and/or the rate matching component 144 to rate match around the semi-persistent ZP-CSI-RS after receiving a PDSCH for the G-RNTI scheduled with the HARQ process identifier and a NDI being flipped. Accordingly, the UE 104, the TX processor 368, the RX processor 356, and/or the controller/processor 359 executing the multicast receiver component 140 and/or the rate matching component 144 may provide means for rate matching around the semi-persistent ZP-CSI-RS after receiving a PDSCH for the G-RNTI scheduled with the HARQ process identifier and a NDI being flipped.

Figure 8:
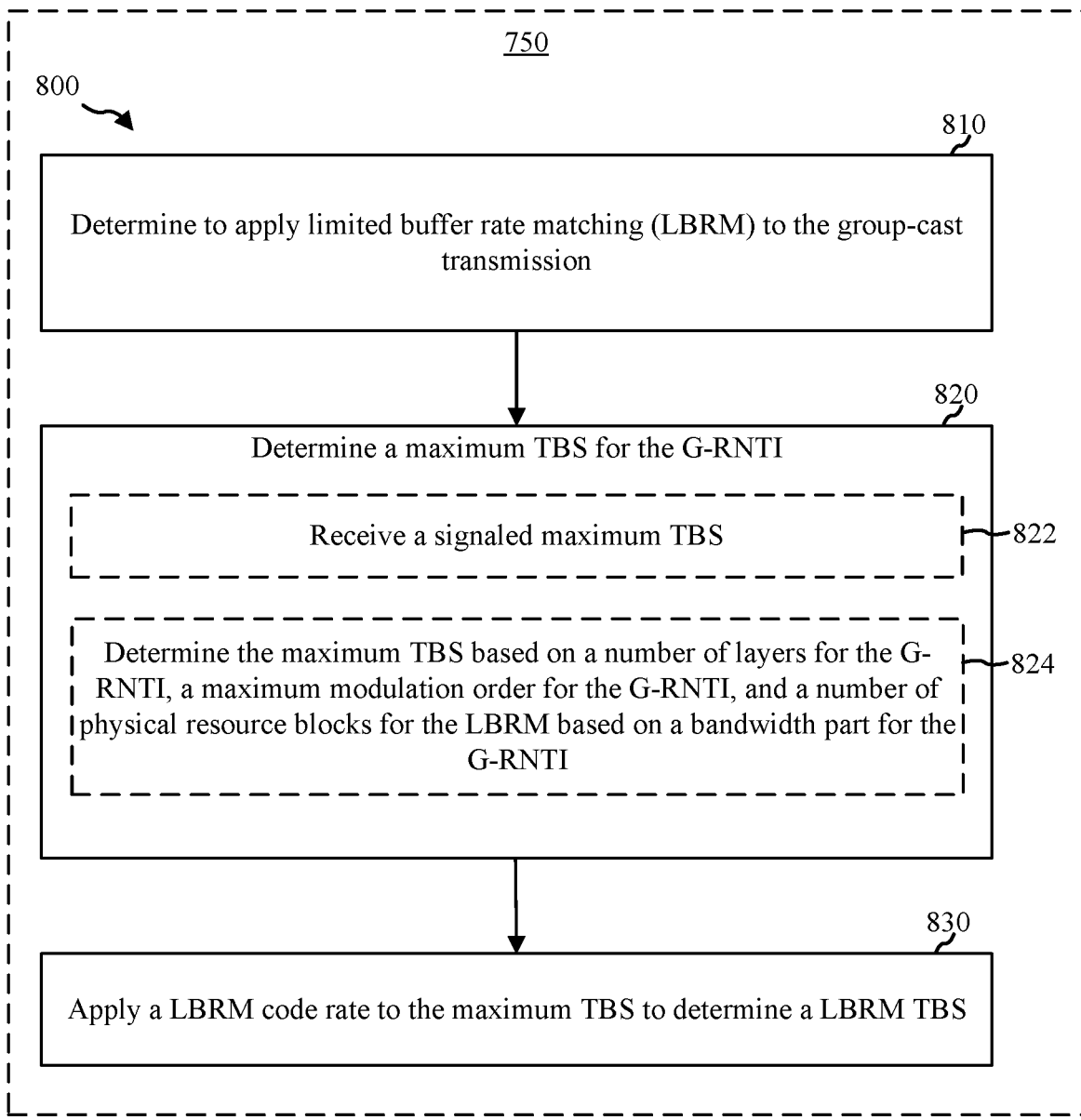
FIG. 8 is a flowchart of an example method of performing limited buffer rate matching, in accordance with certain aspects of the present description.

FIG. 8 is a flowchart of a method 800 of wireless communication that may be performed by a UE (e.g., the UE 104, which may include the memory 360 and which may be the entire UE 104 or a component of the UE 104 such as the multicast receiver component 140, TX processor 368, the RX processor 356, and/or the controller/processor 359) for performing rate matching using LDRM. In an aspect, the method 800 may correspond to the block 740 of the method 700. The method 800 may be performed by the TBS component 143 and/or the rate matching component 144.

In block 810, the method 800 may include determining to apply limited buffer rate matching (LBRM) to the multicast transmission. In an aspect, for example, the UE 104, TX processor 368, the RX processor 356, and/or the controller/processor 359 may execute the rate matching component 144 to determine to apply limited buffer rate matching (LBRM) to the multicast transmission.

In block 820, the method 800 may include determining a maximum TBS for the G-RNTI. In an aspect, for example, the UE 104, TX processor 368, the RX processor 356, and/or the controller/processor 359 may execute the TBS component 143 to determine a maximum TBS for the G-RNTI. For example, at sub-block 822, the TBS component 143 may optionally receive a signaled maximum TBS. For example, the signaled maximum TBS 513 may be received on the MIB/SIB 510 or the multicast configuration 530. As another example, at sub-block 824, the TBS component 143 may optionally determine the maximum TBS based on a number of layers for the G-RNTI, a maximum modulation order for the G-RNTI, and a number of physical resource blocks for the LBRM based on a bandwidth part for the G-RNTI.

In block 830, the method 800 may include applying a LBRM code rate to the maximum TBS to determine a LBRM TBS. In an aspect, for example, the UE 104, TX processor 368, the RX processor 356, and/or the controller/processor 359 may execute the rate matching component 144 to apply a LBRM code rate to the maximum TBS to determine a LBRM TBS.

Figure 9:
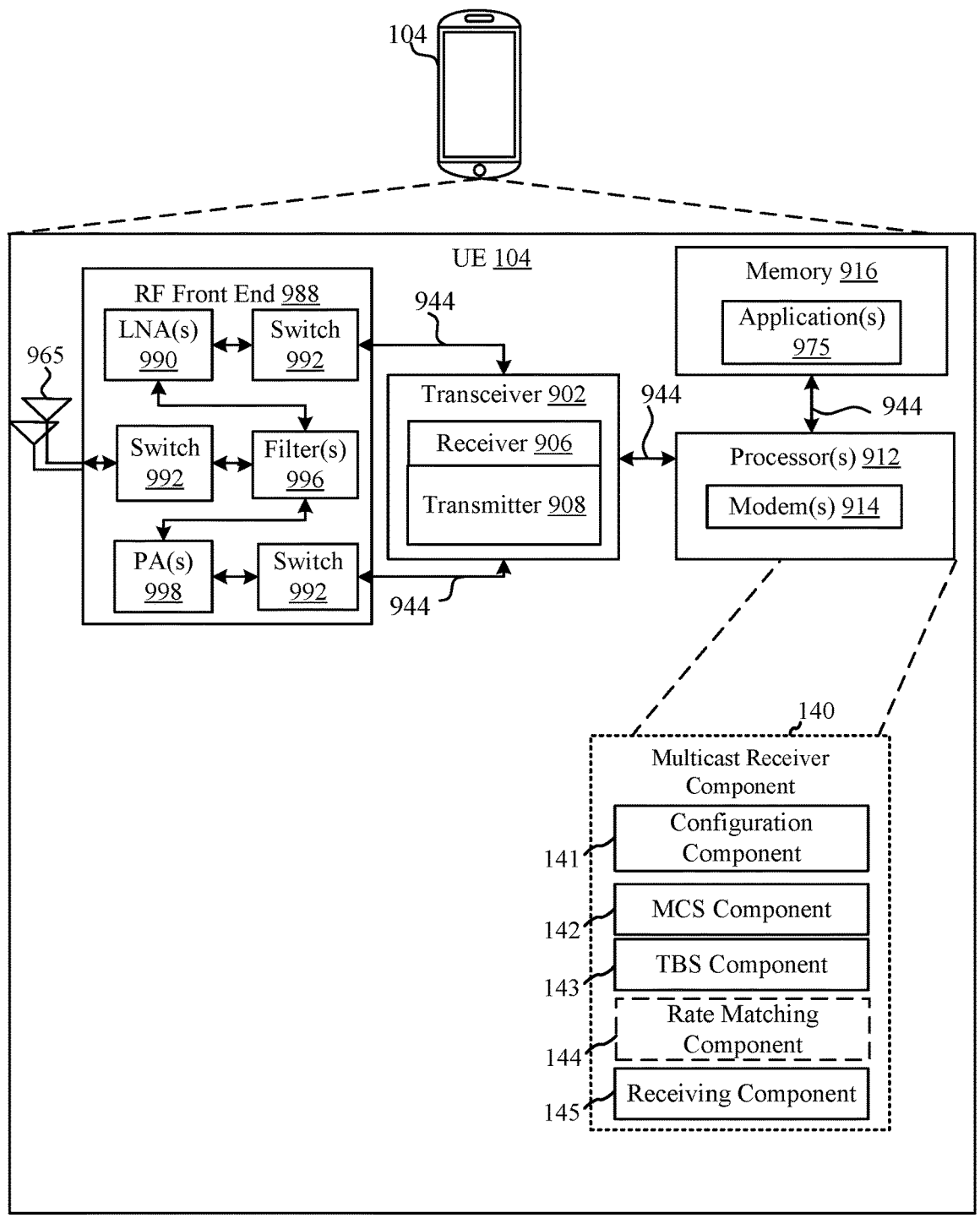
FIG. 9 is a schematic diagram of example components of the UE of FIG. 1, in accordance with certain aspects of the present description.

Referring to FIG. 9, one example of an implementation of UE 104 may include a variety of components, some of which have already been described above, but including components such as one or more processors 912 and memory 916 and transceiver 902 in communication via one or more buses 944, which may operate in conjunction with modem 914, and multicast receiver component 140 to enable one or more of the functions described herein related to receiving a multicast transmission for a G-RNTI. Further, the one or more processors 912, modem 914, memory 916, transceiver 902, RF front end 988 and one or more antennas 965 may be configured to support voice and/or data calls (simultaneously or non-simultaneously) in one or more radio access technologies. The antennas 965 may include one or more antennas, antenna elements, and/or antenna arrays.

In an aspect, the one or more processors 912 may include a modem 914 that uses one or more modem processors. The various functions related to multicast receiver component 140 may be included in modem 914 and/or processors 912 and, in an aspect, may be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 914 associated with multicast receiver component 140 may be performed by transceiver 902.

Also, memory 916 may be configured to store data used herein and/or local versions of applications 975, Multicast receiver component 140 and/or one or more of subcomponents thereof being executed by at least one processor 912. Memory 916 may include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining multicast receiver component 140 and/or one or more of subcomponents thereof, and/or data associated therewith, when UE 104 is operating at least one processor 912 to execute multicast receiver component 140 and/or one or more subcomponents thereof.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and may include one or more low-noise amplifiers (LNAs) 990, one or more switches 992, one or more power amplifiers (PAs) 998, and one or more filters 996 for transmitting and receiving RF signals.

In an aspect, LNA 990 may amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 may be used by RF front end 988 to filter a received signal to obtain an input RF signal. Similarly, in an aspect, for example, a respective filter 996 may be used to filter an output from a respective PA 998 to produce an output signal for transmission. In an aspect, each filter 996 may be connected to a specific LNA 990 and/or PA 998. In an aspect, RF front end 988 may use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver 902 may be tuned to operate at specified frequencies such that UE 104 can communicate with, for example, one or more base stations 102 or one or more cells associated with one or more base stations 102. In an aspect, for example, modem 914 may configure transceiver 902 to operate at a specified frequency and power level based on the UE configuration of the UE 104 and the communication protocol used by modem 914.

In an aspect, modem 914 may be a multiband-multimode modem, which can process digital data and communicate with transceiver 902 such that the digital data is sent and received using transceiver 902. In an aspect, modem 914 may be multiband and be configured to support multiple frequency bands for a specific communications protocol. In an aspect, modem 914 may be multimode and be configured to support multiple operating networks and communications protocols. In an aspect, modem 914 may control one or more components of UE 104 (e.g., RF front end 988, transceiver 902) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 10:
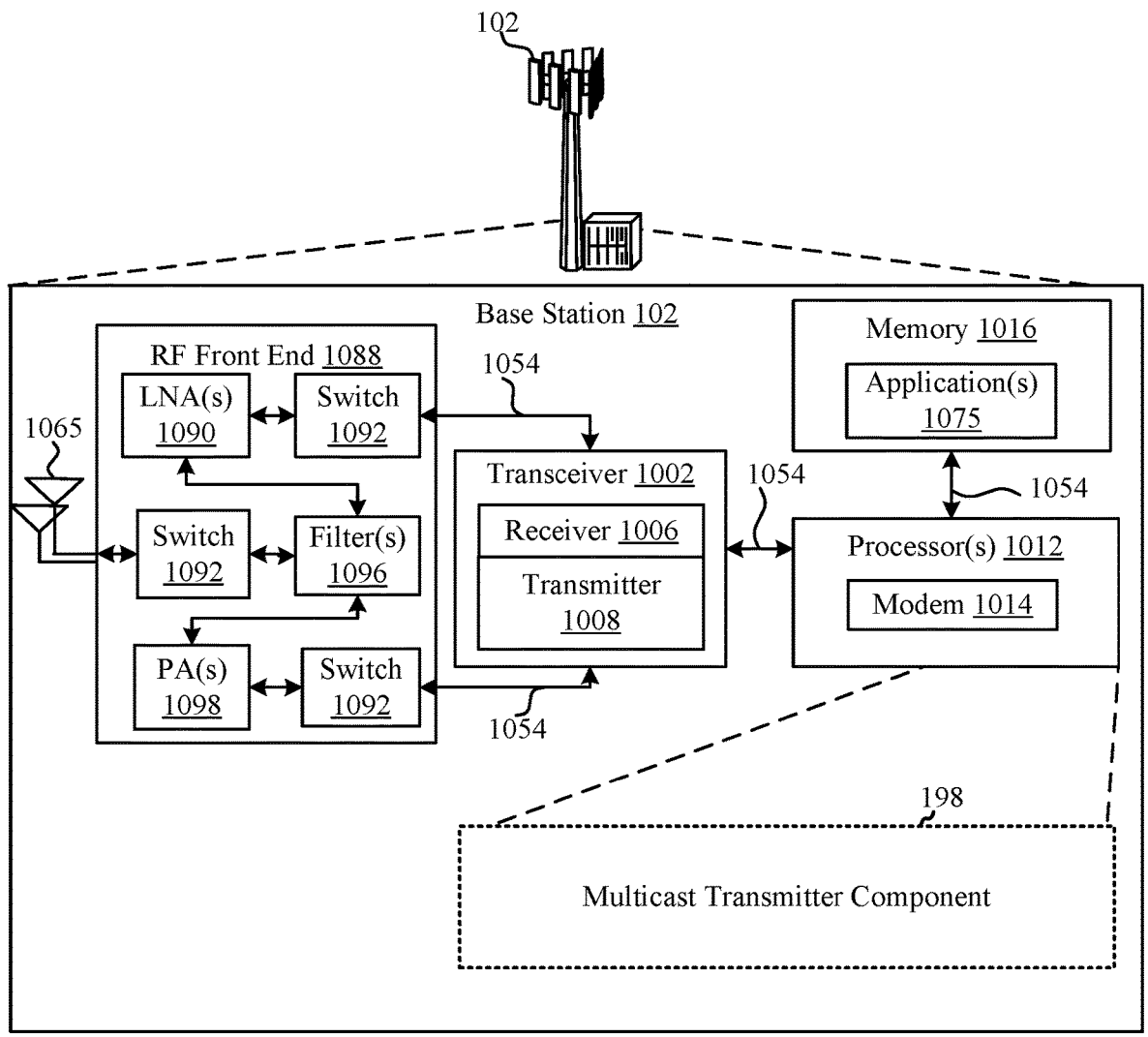
FIG. 10 is a schematic diagram of example components of the base station of FIG. 1, in accordance with certain aspects of the present description.

Referring to FIG. 10, one example of an implementation of base station 102 may include a variety of components, some of which have already been described above, but including components such as one or more processors 1012 and memory 1016 and transceiver 1002 in communication via one or more buses 1054, which may operate in conjunction with modem 1014 and multicast transmitter component 198 to enable one or more of the functions described herein related to PDCCH limits.

The transceiver 1002, receiver 1006, transmitter 1008, one or more processors 1012, memory 1016, applications 1075, buses 1054, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

Some Further Example Implementations

A first method of wireless communication, comprising: receiving, at a user equipment (UE), one or more configurations for multicast transmissions, each configuration associated with a group radio network temporary identifier (G-RNTI); selecting a modulation and coding scheme (MCS) table for the G-RNTI; receiving downlink control information associated with the G-RNTI; determining a transport block size (TBS) for a multicast transmission based on an overhead value for the G-RNTI and the downlink control information received for the G-RNTI; and decoding the multicast transmission based on the MCS table and the TBS.

The above first example method, wherein selecting the MCS table for the G-RNTI comprises selecting a default MCS table for all multicast transmissions for the G-RNTI.

The above first example method, wherein selecting the MCS table for the G-RNTI comprises receiving a configuration of the MCS table for the G-RNTI.

Any of the above first example methods, wherein the configuration of the MCS table for the G-RNTI is received via system information.

Any of the above first example methods, wherein the configuration of the MCS table for the G-RNTI is received via a unicast radio resource configuration message.

The above first example method, wherein selecting the MCS table for the G-RNTI comprises selecting a UE-specific MCS table for G-RNTI transmissions scheduled in a UE-specific search space and selecting a default or configured table for G-RNTI transmissions scheduled in a common search space.

Any of the above first example methods, wherein determining the TBS for the multicast transmission based on the overhead value comprises determining the TBS for the multicast transmission based on the overhead value being a default value.

Any of the above first example methods, wherein determining the TBS for the multicast transmission based on the overhead value comprises receiving a configuration of a UE-specific overhead value.

Any of the above first example methods, wherein each UE receiving the multicast transmission is configured with a same UE-specific overhead value.

Any of the above first example methods, wherein the configuration of the UE-specific overhead value is received via a unicast radio resource configuration message.

Any of the above first example methods, wherein determining the TBS for the multicast transmission based on the overhead value for the G-RNTI is based on a configured overhead value in the configuration for multicast transmissions on a system information block.

Any of the above first example methods, further comprising: determining to apply limited buffer rate matching (LBRM) to the multicast transmission; determining a maximum TBS for the G-RNTI; and applying a LBRM code rate to the maximum TBS to determine a LBRM TBS.

Any of the above first example methods, wherein determining the maximum TBS comprises receiving a signaled maximum TBS.

Any of the above first example methods, wherein determining the maximum TBS comprises determining the maximum TBS based on one or more of a number of layers for the G-RNTI, a maximum modulation order for the G-RNTI, and a number of physical resource blocks for the LBRM based on a bandwidth part for the G-RNTI.

Any of the above first example methods, wherein decoding the multicast transmission based on the MCS table and the TBS comprises rate matching a transport block to physical downlink shared channel (PDSCH) resources based on a rate matching pattern for the G-RNTI.

Any of the above first example methods, wherein the rate matching pattern for the G-RNTI is indicated by the downlink control information.

Any of the above first example methods, wherein the UE monitors a physical downlink control channel (PDCCH) candidate for the G-RNTI with aggregation level 8, and rate matching the transport block comprises rate matching the transport block around resources corresponding to a PDCCH candidate with aggregation level 16.

Any of the above first example methods, wherein the rate matching pattern does not rate match the transport block around resources for a cell specific reference signal.

Any of the above first example methods, wherein the rate matching pattern indicates rate matching around resources for a cell specific reference signal.

Any of the above first example methods, wherein the configuration for the G-RNTI indicates the cell specific reference signal.

Any of the above first example methods, wherein the rate matching pattern indicates rate matching around a configured set of zero power channel status information reference signal (ZP-CSI-RS) for the G-RNTI.

Any of the above first example methods, further comprising: receiving a media access control-control element (MAC-CE) using the G-RNTI with a HARQ process identifier indicating that a semi-persistent ZP-CSI-RS is activated; and rate matching around the semi-persistent ZP-CSI-RS after receiving a PDSCH for the G-RNTI scheduled with the HARQ process identifier and a new data indicator (NDI) being flipped.

Any of the above first example methods, wherein the configuration for the G-RNTI indicates the ZP-CSI-RS.

Any of the above first example methods, wherein the rate matching pattern does not rate match the transport block around resources for a semi-persistent ZP-CSI-RS for the G-RNTI.

Any of the above first example methods, wherein the G-RNTI comprises one of a RNTI for decoding a multicast control channel (MCCH) or a RNTI for decoding a multicast transport channel (MTCH), wherein determining the TBS for the multicast transmission is based on whether the G-RNTI is the RNTI for decoding the MCCH or the RNTI for decoding the MTCH.

A first example apparatus for wireless communication, comprising: a memory; and at least one processor coupled to the memory and configured to perform any of the above first example methods.

A second example apparatus for wireless communication, comprising means for performing any of the above first example methods.

A first example non-transitory computer-readable medium storing computer executable code. The code when executed by a processor causes the processor to perform any of the above first example methods.

A second example method of wireless communication, comprising: transmitting, by a base station, one or more configurations for multicast transmissions to one or more user equipment (UE), each configuration associated with a group radio network temporary identifier (G-RNTI); selecting a modulation and coding scheme (MCS) table for the G-RNTI; transmitting downlink control information associated with the G-RNTI to the one or more UE; determining a transport block size (TBS) for a multicast transmission based on an overhead value for the G-RNTI and the downlink control information for the G-RNTI; and transmitting the multicast transmission based on the MCS table and the TBS.

A third example apparatus for wireless communication, comprising: a memory; and at least one processor coupled to the memory and configured to perform any of the above second example methods.

A fourth example apparatus for wireless communication, comprising means for performing any of the above second example methods.

A second example non-transitory computer-readable medium storing computer executable code. The code when executed by a processor causes the processor to perform any of the above second example methods.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, at a user equipment (UE), one or more configurations for multicast or broadcast transmissions, the one or more configurations associated with a group radio network temporary identifier (G-RNTI);
   selecting a modulation and coding scheme (MCS) table for the G-RNTI;
   receiving downlink control information associated with the G-RNTI;
   determining a transport block size (TBS) for a multicast or broadcast transmission based on an overhead value for the G-RNTI and the downlink control information received for the G-RNTI, wherein determining the TBS for the multicast or broadcast transmission based on the overhead value comprises receiving a configuration of a UE-specific overhead value; and
   decoding the multicast or broadcast transmission based on the MCS table and the TBS.

2. The method of claim 1, wherein selecting the MCS table for the G-RNTI comprises selecting a default MCS table for all multicast or broadcast transmissions for the G-RNTI.

3. The method of claim 1, wherein selecting the MCS table for the G-RNTI comprises receiving a configuration of the MCS table for the G-RNTI.

4. The method of claim 3, wherein the configuration of the MCS table for the G-RNTI is received via system information.

5. The method of claim 3, wherein the configuration of the MCS table for the G-RNTI is received via a unicast radio resource configuration message.

6. The method of claim 1, wherein selecting the MCS table for the G-RNTI comprises selecting a UE-specific MCS table for G-RNTI transmissions scheduled in a UE-specific search space and selecting a default or configured MCS table for G-RNTI transmissions scheduled in a common search space.

7. The method of claim 1, wherein determining the TBS for the multicast or broadcast transmission based on the overhead value comprises determining the TBS for the multicast or broadcast transmission based on the overhead value being a default value.

8. The method of claim 1, wherein each UE receiving the multicast or broadcast transmission is configured with a same UE-specific overhead value.

9. The method of claim 1, wherein the configuration of the UE-specific overhead value is received via a unicast radio resource configuration message.

10. The method of claim 1, wherein determining the TBS for the multicast or broadcast transmission based on the overhead value for the G-RNTI is based on a configured overhead value in the one or more configurations for multicast or broadcast transmissions on a system information block.

11. The method of claim 1, further comprising:
    determining to apply limited buffer rate matching (LBRM) to the multicast or broadcast transmission;
    determining a maximum TBS for the G-RNTI; and
    applying a LBRM code rate to the maximum TBS to determine a LBRM TBS.

12. The method of claim 11, wherein determining the maximum TBS comprises receiving a signaled maximum TBS.

13. The method of claim 11, wherein determining the maximum TBS comprises determining the maximum TBS based on one or more of a number of layers for the G-RNTI, a maximum modulation order for the G-RNTI, and a number of physical resource blocks for the LBRM based on a bandwidth part for the G-RNTI.

14. The method of claim 1, wherein decoding the multicast or broadcast transmission based on the MCS table and the TBS comprises rate matching a transport block to physical downlink shared channel (PDSCH) resources based on a rate matching pattern for the G-RNTI.

15. The method of claim 14, wherein the rate matching pattern for the G-RNTI is indicated by the downlink control information.

16. The method of claim 14, wherein the UE monitors a physical downlink control channel (PDCCH) candidate for the G-RNTI with aggregation level 8, and rate matching the transport block comprises rate matching the transport block around resources corresponding to a PDCCH candidate with aggregation level 16.

17. The method of claim 14, wherein the rate matching pattern does not rate match the transport block around resources for a cell specific reference signal.

18. The method of claim 14, wherein the rate matching pattern indicates rate matching around resources for a cell specific reference signal.

19. The method of claim 18, wherein the configuration for the G-RNTI indicates the cell specific reference signal.

20. The method of claim 14, wherein the rate matching pattern indicates rate matching around a configured set of zero power channel status information reference signal (ZP-CSI-RS) for the G-RNTI.

21. The method of claim 14, further comprising:
    receiving a media access control-control element (MAC-CE) using the G-RNTI with a HARQ process identifier indicating that a semi-persistent ZP-CSI-RS is activated; and rate matching around the semi-persistent ZP-CSI-RS after receiving a physical downlink shared channel (PDSCH) for the G-RNTI scheduled with the HARQ process identifier and a new data indicator (NDI) being flipped.

22. The method of claim 21, wherein the configuration for the G-RNTI indicates the ZP-CSI-RS.

23. The method of claim 14, wherein the rate matching pattern does not rate match the transport block around resources for a semi-persistent ZP-CSI-RS for the G-RNTI.

24. The method of claim 1, wherein the G-RNTI comprises one of a RNTI for decoding a multicast control channel (MCCH) or a RNTI for decoding a multicast transport channel (MTCH), wherein determining the TBS for the multicast or broadcast transmission is based on whether the G-RNTI is the RNTI for decoding the MCCH or the RNTI for decoding the MTCH.

25. An apparatus for wireless communication, comprising:
a memory; and
at least one processor coupled to the memory and configured to:
receive, at a user equipment (UE), one or more configurations for multicast or broadcast transmissions, the one or more configurations associated with a group radio network temporary identifier (G-RNTI);
select a modulation and coding scheme (MCS) table for the G-RNTI;
receive downlink control information associated with the G-RNTI;
determine a transport block size (TBS) for a multicast or broadcast transmission based on an overhead value for the G-RNTI and the downlink control information received for the G-RNTI, wherein the overhead value for the G-RNTI is based on a configuration or a UE-specific overhead value; and
decode the multicast or broadcast transmission based on the MCS table and the TBS.

26. The apparatus of claim 25, wherein the at least one processor is configured to select the MCS table for the G-RNTI as one of: a default MCS table for all multicast or broadcast transmissions for the G-RNTI; a received configuration of the MCS table for the G-RNTI; or a UE-specific MCS table for G-RNTI transmissions scheduled in a UE-specific search space.

27. The apparatus of claim 25, wherein the at least one processor is configured to:

determine to apply limited buffer rate matching (LBRM) to the multicast or broadcast transmission;
determine a maximum TBS for the G-RNTI; and
apply a LBRM code rate to the maximum TBS to determine a LBRM TBS.

28. A method of wireless communication, comprising:
transmitting, by a base station, one or more configurations for multicast or broadcast transmissions to one or more user equipment (UE), the one or more configurations associated with a group radio network temporary identifier (G-RNTI);
selecting a modulation and coding scheme (MCS) table for the G-RNTI;
transmitting downlink control information associated with the G-RNTI to the one or more UE;
determining a transport block size (TBS) for a multicast or broadcast transmission based on an overhead value for the G-RNTI and the downlink control information for the G-RNTI, wherein determining the TBS for the multicast or broadcast transmission is based on a configuration of a UE-specific overhead value; and
transmitting the multicast or broadcast transmission based on the MCS table and the TBS.

29. An apparatus for wireless communication, comprising:
a memory; and
at least one processor coupled to the memory and configured to:
transmit, by a base station, one or more configurations for multicast or broadcast transmissions to one or more user equipment (UE), the one or more configurations associated with a group radio network temporary identifier (G-RNTI);
select a modulation and coding scheme (MCS) table for the G-RNTI;
transmit downlink control information associated with the G-RNTI to the one or more UE;
determine a transport block size (TBS) for a multicast or broadcast transmission based on an overhead value for the G-RNTI and the downlink control information for the G-RNTI, wherein the overhead value for the G-RNTI is based on a configuration of a UE-specific overhead value; and
transmit the multicast or broadcast transmission based on the MCS table and the TBS.

* * * * *